US007252767B2

(12) United States Patent
Bortun et al.

(10) Patent No.: US 7,252,767 B2
(45) Date of Patent: Aug. 7, 2007

(54) HYDROUS ZIRCONIUM OXIDE, HYDROUS HAFNIUM OXIDE AND METHOD OF MAKING SAME

(75) Inventors: Anatoly I. Bortun, Easton, PA (US); Clive J. Butler, Easton, PA (US)

(73) Assignee: Magnesium Elektron, Inc., Flemington, NJ (US)

( * ) Notice: Subject to any disclaimer, the term of this patent is extended or adjusted under 35 U.S.C. 154(b) by 349 days.

(21) Appl. No.: 10/195,875

(22) Filed: Jul. 15, 2002

(65) Prior Publication Data
US 2004/0007531 A1    Jan. 15, 2004

(51) Int. Cl.
C01G 25/00    (2006.01)
(52) U.S. Cl. .................... 210/660; 210/685; 210/688; 423/608; 423/84; 252/184; 502/300; 502/349; 502/439
(58) Field of Classification Search ............... 423/608, 423/84; 210/660, 685, 688; 502/300, 349, 502/439; 252/184
See application file for complete search history.

(56) References Cited

U.S. PATENT DOCUMENTS

| | | | |
|---|---|---|---|
| 2,349,243 A | | 5/1944 | Bates |
| 3,002,932 A | * | 10/1961 | Duwell et al. ............... 252/179 |
| 3,056,647 A | | 10/1962 | Amphlett |
| 3,130,147 A | | 4/1964 | Dwyer |
| 3,359,213 A | * | 12/1967 | Clearfield ..................... 515/90 |
| 3,485,763 A | | 12/1969 | Lefevre et al. |
| 3,522,187 A | * | 7/1970 | Kraus ..................... 252/182.33 |
| 3,551,095 A | * | 12/1970 | Blumenthal ................... 423/84 |
| 3,850,835 A | | 11/1974 | Marantz et al. |
| 4,025,608 A | | 5/1977 | Tawil et al. |
| 4,381,289 A | | 4/1983 | Nowell et al. |
| 4,415,677 A | | 11/1983 | Lee et al. |
| 4,488,949 A | * | 12/1984 | Lee et al. .................... 205/536 |
| 4,512,905 A | | 4/1985 | Clearfield et al. |
| 4,526,765 A | | 7/1985 | Ito et al. |
| 4,695,642 A | | 9/1987 | Derouane et al. |
| 4,806,517 A | | 2/1989 | Vanderpool et al. |
| 4,902,426 A | | 2/1990 | Macedo et al. |
| 5,002,749 A | | 3/1991 | Recasens |
| 5,210,363 A | | 5/1993 | Sweeney |
| 5,441,991 A | * | 8/1995 | Bibler et al. ................... 521/35 |
| 5,885,925 A | * | 3/1999 | DeFilippi et al. ........... 502/427 |
| 6,077,809 A | | 6/2000 | Suzuki et al. |
| 6,268,307 B1 | * | 7/2001 | DeFilippi et al. ........... 502/427 |
| 6,326,328 B1 | | 12/2001 | Matsuzawa |
| 6,379,641 B1 | | 4/2002 | Bedard et al. |
| 6,391,278 B1 | | 5/2002 | Pinavaia et al. |
| 6,602,919 B1 | | 8/2003 | Collins |

FOREIGN PATENT DOCUMENTS

FR    1317359    1/1963

OTHER PUBLICATIONS

*Structure of Zirconium phosphate gels produced by the sol-gel method*, S.G. Bogdanov et al., J. Phys.: Codens, Matter 9 (1997), pp. 4031-4039.
*The effect of mineralizer on the crystallization of zirconia gel under hydrothermal conditions*, G Dell'Agli et al., Solid State Ionics 123 (1999) pp. 87-94.
*Preparation of stable, high surface area zirconia*, K.S. Chan et al., J. Mat. Science, 12, N21, 1579-1581 (1994).
*Scientific Bases for the Synthesis of Highly Dispersed Framework Zirconium Phosphate Catalysts for Paraffin Isomerization and Selective Oxidation*, Sadykov et al., Kinetics and Catalysis, vol. 42, No. 3 (2001), pp. 391-398.
*Preparation and Sorption Properties of Spherical Polyacrylamide-Zirconium Phosphate Ion-Exhanger*, Chao-Yeuh, Yang et al., Separation Science and Technology, 18(1), pp. 83-91, 1983.
*Sol-gel preparation of nanostructured adsorbents*, Y.S. Lin and S.G. Deng, Adsorption and its Application in Industry and Environmental Protection Studies in Surface Science and Catalysts, vol. 120, pp. 653-686, 1998.

(Continued)

*Primary Examiner*—Steven Bos
(74) *Attorney, Agent, or Firm*—Pearne & Gorden LLP

(57) ABSTRACT

The present invention features a method of making hydrous zirconium oxide having desirable properties, including resistance to moisture content, predetermined particle size, and developed porosity and surface area. The inventive material is suitable for use as an ion exchanger, a catalyst and a catalyst support. The process comprises providing a liquid comprising a zirconium compound and an alkali metal-containing reagent. The alkali metal-containing reagent may comprise a compound selected from the group consisting of $MOH-M_2SO_4$, $MOH-M_3PO_4$, and combinations thereof, where M is at least one of Li, Na and K. The zirconium compound may be treated with the alkali metal-containing reagent effective to form a mixture which achieves an uptake of alkali metal in an amount ranging from 0.5 to 2.5 meq/g. The mixture is reacted to form the hydrous zirconium oxide. A molar ratio of $SO_4/Zr$ and $PO_4/Zr$ in the mixture may range from 0.2-0.7:1. The mixture may be heated at a temperature ranging from 80 to 150° C. to produce a reaction product. The reaction product may be treated with acid having a pH ranging from 4 to 8 at a temperature ranging from 20 to 60° C. to form the hydrous zirconium oxide. Also featured is a method of making hydrous hafnium oxide. The inventive hydrous zirconium oxide and hydrous hafnium oxide are characterized by at least one of the following: stability against moisture loss, a particular surface area, a particular pore size distribution, an affinity towards anions including at least one of $PO_4$, $HPO_4$, $H_2PO_4$, $AsO_4$, $HAsO_4$, $H_2AsO_4$ and $AsO_3$, oxoanions of Cr, Se, B, Mo, and W, and/or resistance against poisoning by $SiO_3$ and $SO_4$.

40 Claims, 2 Drawing Sheets

OTHER PUBLICATIONS

Ion Exhange Properties of Tin (IV) Materials —I Hydrous TIN (IV) Oxide and its Cation Exchange Properties. Donaldson and M.J. Fuller, J. inorg. nucl.Chem., 1968, vol. 30, pp. 1083-1092.

*Preparation and characterisation of mesoporous, high-surface-area zirconium (IV) oxide*, Michael J. Hudson and James A. Knowles, J. Mater. Chem., 1996, 6(1), pp. 89-95.

*Parameter control in the synthesis of ordered porous zirconium oxide*, Han-Rong Chen et al., Materials Letters 51 (Nov. 2001), pp. 187-193.

*Preparation of zirconia powder by the pyrolysis of active carbon*, M. Ozawa and M. Kimura, Journal of Material Science Letters 9 (1990) pp. 446-448.

*Effects of Chemical Species on the Crystallization Behavior of a Sol-Derived Zirconia Precursor*, C.L. Ong et al., J. Am. Ceram. Soc. 81 (10), pp. 2624-2628 (1998).

*Morphology of Zirconia Synthesized Hydrothermally from Zirconium Oxychloride*, Bruno Mottet, et al.., J. Am. Ceram. Soc. 75 (9), pp. 2515-2519 (1992).

*Microwave-Hydrothermal Synthesis of Nanocrystalline Zirconia Powders*, Federica Bondioli et al., J. Am. Ceram. Soc., 84(11), pp. 2728-2730 (2001).

*Highly Ordered Porous Zirconias from Surfactant-Controlled Synthesis: Zirconium Oxide-Sulfate and Zirconium Oxo Phosphate*, Ulrike Ciesia et al., Chem. Mater, 1999, vol. 11, No. 2, pp. 227-234.

*Inorganic Ion Exhange Materials Group IV Hydrous Oxides-Synthetic Inorganic Ion Exchangers*, Chapter 5, Abraham Clearfield, Ph.D, Ed., CRC Press, Inc., 1982, pp. 141-160.

*The Preparation of Crystalline Zirconium Phosphate and Some Observations on its Ion Exchange Behaviour*, A. Clearfield and J.A. Stynes, J. Inorg. Nucl. Chem., vol. 26, 1964, pp. 117-129.

*New Crystalline Phases of Zirconium Phosphate Possessing Ion-Exchange Properties*, A. Clearfield et al., J. Inorg. Nucl. Chem., 1968, vol. 30, pp. 2249-2258.

*Uptake of Inorganic Acids on Hydrogels of Tetravalent Hydroxides and its Application for the Preparation of Some Inorganic Sorbents*, R. Caletka et al., Journal of Radioanalytical Chemistry, vol. 30 (1976), pp. 155-172.

*Synthesis and Study of New Compounds $(M^I)(N^{IV})_2(PO_4)_3$ with Nasicon-Like Structure (M=AG. Cu; N=Ge H, Sn, Ti, Zr)*, J.M. Winand et al., Journal of Solid State Chemistry 107, (1993), pp. 356-361.

*Preparation of Porous Resin Loaded with Crystalline Hydrous Zirconium Oxide and its Application to the Removal of Arsenic*, T. M. Suzuki et al., Reactive & Functional Polymers 43 (2000), 165-172.

*Hydrothermal Preparation of the Low-Expansion NZP Family of Materials*,Sridhar Komarneni, Int. J. High Technology Ceramis 4 (1988), pp. 31-39.

*Structure of the Active Sites on $H_2PO_4/ZrO_2$ Catalysts for Dimethyl Carbonate Synthesis From Menthanol and Carbon Dioxide*, Yoshiki Ikeda et al., J. Phys. Chem B 2001, 105, pp. 10653-10658.

*Zirconium Phosphates*, Abraham Clearfield, Inorganic Ion Exchange Materials, Chapter 1, pp. 1-74.

*A Novel Layered Zirconium Phosphate $Zr_{O,J}(HPO_4)$. Synthesis and Characterization of Properties*, Anatoly Bortun et al., Solvent Extraction and Ion Exchange, 15(2), pp. 305-328 (1997).

*Synthesis of Semicrystalline Materials by Organic Compound Intercalation into Amorphous Titanium Phosphate*, Anatoly Bortun and V. V. Strelko, Chem Mater, 1995, 7, pp. 249-251.

[31] *P-MASNMR-Spectroscopic Studies with Zirconium Phosphate Catalysts*, Koh-Ichi Segawa et al., Journal of Catalysis 101 pp. 81-89 (1986).

*P Solid-State NMR Studies of the Structure of Amine-Intercalated a-Zirconium Phosphate. Recation of a-Zirconium Phosphate with Excess Amine*, D.J. MacLachlan, J. Phys. Chem. 1990, 94, pp. 7656-7661.

*Preparation and Characterization of a New 3-Dimensional Zirconium Hydrogen Phosphate, r-Zr(HPO_4)YDetermination of the Complete Crystal Structure Combining Synchrotron X-ray Single-Crystal Diffraction and Neutron Powder Diffraction*, Anne Marie Krogh Andersen, Inorg. Chem 1998, 37, pp. 876-881.

*Proton Conductivity and Humidity-Sensing Properties at High Temperature of the NASICON-Based Composite* Material $HZr_2P_2O$, $ZrP_2O$,. Shouhua Feng et al., Chem Mater, 1993, 5, pp. 1277-1282.

*Zirconium Deficiency in Nasicon-Type Compounds: Crystal Structure of $Na_7Zr(PO_4)$,*. J.P. Boilot et al., Journal of Solid State Chemistry, 50, pp. 91-99, (1983).

*Hydrothermal Synthesis and Characterisation of Crystalline Sodium Zirconium Phosphates*, M.K. Dongare et al., Mat. Res. Bull., vol. 27, pp. 637-645 (1992).

*Zirconium and Hafnium Hydroxo-orthophosphates*, N.G. Chernorukov et al., Russian Journal of Inorganic Chemistry, 28 (7) 1983 pp. unknown.

*The Sorptionof First-Row Transition Metal Ions on a Zirconium Phosphate Gel of Low Crystallinity and Study of the Reproducibility of the Gel*, Sten Ahrland et al., J. Inorg. Nucl. Chem, 1970. vol. 32, pp. 2069-2078.

*Direct Hydrothermal sysntesis of Zirconium phosphate and Zirconium arsenate with a novel basic layered structure in alkaline media*, Abraham Clearfield, et al., Inorganic Chemistry Communications 1 (1998) pp. 206-208.

*Solid-state Nuclear Magnetic Resonance Spectroscopic Study of γ-Zirconium Phosphate*, Nigel Clayden, J Chem. Soc. Dalton Trans (1987), pp. 1877-1881.

*Influence of Precipitating Agent and Digestion on the Morphology and Microstructure of Hydrous Zirconia*, G.K. Chuah et al., Journal of Catalysis 175, pp. 80-92 (1998) Article No. CA981980.

*Ion Exchange Properties of TIN (IV) Materials-1. Hydrous TIN(IV) Oxide and its Cation Exchange Properties*, J.D. Donaldson et al., J. Inorg. Nucl. Chem., 1968, vol. 30. pp. 1083-1092.

*Preparation and Sorption Properties of Sherical Polyacrylamide-Zirconium Phosphate Ion-Exhanger.*, Chao-Yeuh Yang et al., Separation Science and Technology, 18(1), pp. 83-91, (1983).

*On the Synthesis of a-Zirconium Phosphate*, Camino Trobajo, et al., Chem. Mater, 2000, 12, 1787-1790.

*Synthetic Inorganic Ion Exchangers*, Vesely, V. and Pekarek, V, Talanta 1972, vol. 19, pp. 219-262.

*On the Synthesis of a-Zirconium Phosphate*, Trobajo, Camino et al., Chem. Mater, 2000, vol. 12, pp. 1787-1790.

*Galvanic Cell Type Humidity Sensor with NASICON-Based Material Operative at High Temperature*, Feng et al., Chem. Mater, 1992, vol. 4, pp. 1257-1262.

*Crystalline insoluble salts of polybasic metals—11. Synthesis of crystalline zirconium or titanium phosphate by direct precipitation*, G, Alberti et al., J. Inorg. Chem., vol. 30, pp. 317-318, 1968.

*P MAS NMR Investigations of Crystalline and Glassy NASICON—Type Phosphates*, K.C. Sobha et al., Journal of Solid State Chemistry, vol. 121, pp. 197-201 (1996).

Amphlett, C.B., *Inorganic Ion Exchangers*, Elsevier Publishing Company, New York, (1964), pp. 92-95.

V.V. Streklo, Abstract Translation of *attached Russian article for Chemistry Role in the Environmental Protection*, Naukova Dumka, Kiev (1982) pp. 179-188.

International Search Report, dated Oct. 30, 2003.

\* cited by examiner

HYDROUS ZIRCONIUM OXIDE, HYDROUS HAFNIUM OXIDE AND METHOD OF MAKING SAME

FIELD OF THE INVENTION

The present invention relates to hydrous zirconium oxide and hydrous hafnium oxide useful in applications including ion exchange and catalysis.

BACKGROUND OF THE INVENTION

Ion exchange is an important separation technique that is widely used for water and waste treatment, biochemistry, medicine and environmental protection. The efficiency of separation depends on many factors, including the selectivity of the adsorbent in use. Inorganic ion exchangers and adsorbents, due to properties such as chemical and thermal stability, resistance to oxidation and unique selectivity to certain ions, have definite advantages in comparison with traditionally used organic resins. Inorganic ion exchangers are able to operate in extreme conditions (high temperature or strong radiation fields, in the presence of organic solvents and/or oxidants and in a great excess of competitive ions), where organic resins fail to work efficiently. Among the known inorganic adsorbents, hydrous zirconium oxide (HZO) attracts special attention. HZO shows amphoteric properties and can behave as a cation exchanger in alkaline media or an anion exchanger in acidic media. However, the practical use of HZO is relatively limited because of several factors, among them being poor reproducibility of ion exchange properties and a strong dependency of adsorption performance on moisture content.

There are several methods for making amorphous hydrous zirconium oxides (A. Ruvarac, Group IV Hydrous Oxides—Synthetic Ion Exchangers, in the book, Inorganic Ion Exchange Materials, Ed. A. Clearfield, CRC Press, 1982, pp.141-160). Typically, in the first stage hydrolysis of a zirconium salt takes place, which is followed by condensation of primary particles, formed with hydrated polynuclear species. Hydrolysis of zirconium salts can be achieved by boiling an aqueous zirconium salt for a long period of time or by neutralization with alkali (e.g., LiOH, NaOH, KOH and $NH_4OH$). Freshly prepared hydrous zirconium oxides are amorphous. Upon ageing (e.g., contact with air at room or elevated temperature or treatment with neutral, acidic or alkaline reagents at room or elevated temperature), the primary particles of HZO undergo both intra- and interparticle condensation reactions, with resultant structural ordering of the precipitates. The severity of the ordering strongly depends on the ageing conditions. However, in general an increased degree of ordering in aged hydrous zirconium oxides accounts for the decrease in sorption capacity, due to loss of free hydroxo groups according to the reactions:

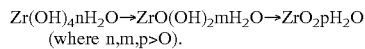

(where n,m,p>O).

Therefore, HZO is the most active when freshly precipitated and its ion exchange performance deteriorates with time (especially at elevated temperature). This is a serious drawback of amorphous materials.

Since the hydrous zirconium oxides obtained by the above mentioned methods are usually in the form of a fine powder, difficulties are encountered in handling them in separation processes. To overcome this disadvantage, several approaches have been proposed to make granulated HZO type materials. Among them are the following:

Impregnation of a porous substrate with a zirconium salt, followed by its hydrolysis via treatment with alkali (M. Ozawa et al., J. Mater. Sci. lett., 9, 446 (1990)). The drawback of this approach is the ease in removing HZO from the pores of the carrier;

Granulation of amorphous hydrous zirconium oxides with the use of binders. The drawbacks of the use of binders include: lower ion exchange capacity, deterioration of kinetics of adsorption and possibility of contamination of the product with the binder components;

Sol-gel or gel routes. The sol-gel granulation process, based on the oil-drop principle, includes conversion of $ZrO_2$ sol into spherical granules of hydrous zirconium oxide gel in organic water immiscible media. The gel method, also based on the oil-drop principle, may include neutralization of zirconium salt with hexamethyltetraamine at 70-80° C. (R. Caletka, M. Tympl, J. Radioanal. Chem., 30: 155 (1976)). Spherically granulated amorphous hydrous zirconium oxides prepared via sol-gel and gel routes have high crush strength and good attrition resistance. However, granulated materials have the drawback of a strong dependency between ion exchange performance and moisture content. Amorphous hydrous polyvalent metal oxides regardless of the method of preparation, lose water continuously during storage in air and especially with an increase of heating temperature (See, for example, J. D. Donaldson, M. J. Fuller, J. Inorg. Nucl. Chem., 30, 1083 (1968)).

Highly ordered mesoporous zirconium oxides can be prepared via surfactant-controlled synthesis (U. Ciesla. et al, Chem. Mater., 11, 227 (1999)). The products show high thermal stability up to 400-500° C., which allows the removal of organic surfactants by calcination. Surfactant-controlled synthesis employs the presence of $SO_4$ or $PO_4$ anions as pore and structure-building elements (H. R. Chen et al, Mater. Letters, 51, 187 (2001)).

Different crystalline phases of zirconium oxide can be prepared by thermal treatment of amorphous gels.

Hydrolysis of aqueous zirconium salts under hydrothermal conditions typically results in crystalline modification of HZO. For example, B. Mottet et al. (J. Am. Ceram. Soc., 759, 2515 (1992)) reported the formation of monoclinic HZO by treatment of zirconium oxychloride in the presence of the additives NaOH, $Na_2CO_3$, $H_2SO_4$, $NH_4F$.

An advantage of crystalline materials is that they are less susceptible to moisture content (water loss) than amorphous sorbents and, as result, are more thermally stable. Ion exchange properties and selectivity of crystalline materials depends on the type of crystal structure. Typically, adsorption capacity of crystalline materials is lower than that of freshly prepared amorphous hydrous zirconium oxide. Another disadvantage of crystalline ion exchangers is poor kinetics of adsorption. Moreover, their powdered form prevents use in column applications.

SUMMARY OF THE INVENTION

In general, the inventive method of making hydrous zirconium oxide comprises the steps of providing a liquid comprising a zirconium compound and an alkali metal-containing reagent. The alkali metal-containing reagent comprises a compound selected from the group consisting of $MOH-M_2SO_4$, $MOH-M_3PO_4$, and combinations thereof, where M is at least one of Li, Na and K. The zirconium compound is treated with the alkali metal-containing reagent effective to form a mixture which achieves an uptake of alkali metal in an amount ranging from 0.5 to 2.5 meq/g. The mixture is reacted to form the hydrous zirconium oxide. The invention also features making hydrous hafnium oxide by the same method except that a hafnium compound rather than a zirconium compound is used.

In the present invention a low extent of substitution of OH groups with alkali metals occurs at a pH of 10-12. These alkaline conditions, in combination with the presence of $SO_4^{2-}$, $PO_4^{3-}$ anions, allow the hydrous zirconium oxide to retain an amorphous structure even after extended heat treatment. The ability of HZO to remain amorphous is advantageous in that it maintains the particle size of the final product.

Referring now to specific aspects of the method, the liquid mixture is formed by mixing a suspension comprising the zirconium compound and an aqueous solution comprising the alkali metal-containing reagent. A molar ratio of $SO_4$/Zr and $PO_4$/Zr in the liquid mixture ranges from (0.2-0.7):1. The liquid mixture comprising the zirconium compound and the alkali metal-containing reagent is heated at a temperature ranging from 80 to 150° C. for 0.5 to 24 hours. In one aspect of the method the liquid mixture is heated at a temperature ranging from 80 to 100° C. for 2 to 24 hours. In another aspect of the method the liquid mixture is heated at a temperature ranging from 100 to 150° C. at a pressure not exceeding 100 psi for 0.5-12 hours. The mixture achieves an uptake of the alkali metal in an amount ranging from 0.8 to 2.0 meq/g.

The zirconium compound comprises a compound selected from the group consisting of zirconium tetrachloride, zirconium oxychloride, zirconium acetate, zirconium sulfate, zirconium nitrate, ammonium zirconium carbonate, potassium zirconium carbonate, zirconium oxide, zirconium sulfate, zirconium basic sulfate, zirconium phosphate and combinations thereof. The zirconium compound is preferably water insoluble. In this regard, the zirconium compound may comprise a water insoluble salt selected from the group consisting of zirconium oxide, zirconium sulfate, zirconium basic sulfate, zirconium phosphate and combinations thereof. The zirconium compound may have a particle size distribution ranging from 10 to 100 microns.

A preferred embodiment of the invention is directed to a method of making hydrous zirconium oxide, comprising the steps of:

providing a suspension comprising a zirconium compound and an aqueous solution comprising an alkali metal-containing reagent, the alkali metal-containing reagent comprising a compound selected from the group consisting of $MOH-M_2SO_4$, $MOH-M_3PO_4$, and combinations thereof, where M is at least one of Li, Na and K;

treating the suspension with the aqueous solution effective to form a mixture which achieves an uptake of alkali metal in an amount ranging from 0.8 to 2.0 meq/g and wherein a molar ratio of $SO_4$/Zr and $PO_4$/Zr in the mixture ranges from 0.2-0.7:1;

heating the mixture at a temperature ranging from 80 to 150° C. to produce a reaction product; and treating the reaction product with acid to form the hydrous zirconium oxide.

Turning now to specific aspects of the method which may be used in the preferred embodiment, the suspension comprises 10 to 30 wt % of the zirconium compound. In one aspect of this method, the mixture is heated for 0.5 to 24 hours. In another aspect of the method the mixture is heated at a temperature ranging from 100 to 150° C. at a pressure not exceeding 100 psi, which heating may be conducted for 0.5-12 hours. The treatment of the reaction product with acid is conducted at a pH ranging from 4 to 8 and at a temperature ranging from 20 to 60° C. for 0.5 to 2 hours. The acid comprises an acid selected from the group consisting of HCl, $HNO_3$, HBr, HClO, $HClO_4$, $CH_3COOH$, CHOOH and combinations thereof. The invention may also feature filtering and washing the reaction product, redispersing in water the filtered and washed reaction product and filtering, washing and drying the treated reaction product. The mixture is treated at a pH ranging from 10 to 12.

In another embodiment of the invention a method of making hydrous zirconium oxide comprises providing an aqueous mixture comprising a water insoluble zirconium compound and an alkali metal-containing reagent. The aqueous mixture is heated at a temperature ranging from 80 to 150° C. to produce a reaction product. The reaction product is treated with acid having a pH ranging from 4 to 8 at a temperature ranging from 20 to 60° C. to form the hydrous zirconium oxide.

The inventive hydrous zirconium oxide and hydrous hafnium oxide, and particular features of the method for making them, may be characterized in terms of the material's stability against moisture loss. While stability against moisture loss is defined in terms of capacity and selectivity of chemical species removed, it should be understood that this does not require use of the inventive material for ion exchange, but rather quantifies the stability of the material against moisture loss, regardless of use of the material as an ion exchanger, catalyst, catalyst support or in another application.

The hydrous zirconium oxide and hydrous hafnium oxide may be amorphous and, while not wanting to be bound by theory, have a quasi-framework structure. Porous inorganic materials can be fully amorphous, para- or semi-crystalline, or crystalline. Amorphous materials do not possess long range order, whereas crystalline materials do. This can be seen in X-ray diffraction patterns in which non-crystalline materials do not exhibit sharp XRD peaks. Semi-crystalline materials may exhibit some chemical structure ordering as shown by broad XRD peaks. The hydrous zirconium oxide of the present invention is amorphous, meaning it has a chemical structure ranging from fully amorphous (no detectable XRD peaks) to semicrystalline (as determined by the existence of broad peaks), but not crystalline (lack of sharp XRD peaks). In particular, amorphous is defined herein by having an XRD pattern in which a height of a peak above baseline across 2θ values ranging from 20 to 38 degrees ranges up to 150 counts and, in particular, from 40 to 150 counts. The XRD pattern of FIG. 1 is used as a reference to define the amorphous character of the inventive material. The inventive material has a quasi-framework structure which, as defined herein, means having an irregular, non-ordered framework structure. The inventive material does not exhibit sharp XRD peaks upon intercalation with n-alkyl amines and thus, possesses a framework, rather than a layered, structure. However, being amorphous, the inventive material does not possess a fully framework structure.

The inventive material is a hydrous or hydrated oxide of zirconium and hafnium which includes hydroxides of zirconium and hafnium but excludes nonhydrated metal oxides (e.g., $ZrO_2$). The type of inventive hydrous zirconium oxide may also be referred to as hydrous or hydrated zirconium dioxide, hydrous or hydrated zirconium oxide, zirconium hydroxide and hydrous or hydrated zirconia. The inventive material includes a composite metal hydroxide and/or a hydrous or hydrated composite metal oxide.

Another embodiment of the present invention is directed to the hydrous zirconium oxide or hydrous hafnium oxide which may be made according to the aforementioned methods or some other as yet unforeseen method. The hydrous zirconium oxide and hydrous hafnium oxide may be characterized by one or more of the following properties. These properties have been measured for the hydrous zirconium oxide and are believed to occur with the hydrous hafnium oxide as well. The material exhibits stability against moisture loss as characterized by a capacity and selectivity for chemical species that the material can remove from a liquid, which do not decrease more than 20% across a moisture content LOD of the material ranging from $0 \leq LOD \leq 40\%$ across a temperature range of up to 200° C. The material has a surface area of at least 150 $m^2/g$, in particular 250 $m^2/g$, and, more particularly at least 300 $m^2/g$. The surface area of a preferred material may range from 300-400 $m^2/g$ and/or have a pore size distribution ranging from 20 to 40 Å. The material has a particle size distribution which is at least 10 microns, in particular, is at least 100 microns, and may range from 10 to 100 microns. Another feature of the material is that it exhibits an affinity towards anions comprising at least one of the following: $PO_4$, $HPO_4$, $H_2PO_4$, $AsO_4$, $HAsO_4$, $H_2AsO_4$, and $AsO_3$, the affinity being characterized by a Kd value of at least 1000 ml/g from 0.001 mol of a aqueous solution comprising phosphorus or arsenic at volume:mass=100:1 ml/g. The material also exhibits an affinity towards species comprising species selected from the group consisting of oxoanions of Cr, Se, B, Mo, W, the affinity being characterized by a Kd value of at least 200 ml/g from 0.001 mol of an aqueous solution comprising these elements at V:m=100:1 ml/g. The material is resistant against poisoning by $SiO_3$ and $SO_4$ anions as characterized wherein Kd values for P- and As-containing oxyanions do not change more than 10% from an initial Kd value in the absence of $SiO_3$ and $SO_4$ anions, compared to a Kd value when adsorption takes place in the presence of an equimolar amount of $SiO_3$ and $SO_4$ anions. The invention features ion exchange media, a catalyst, and a catalyst support comprised of the inventive material.

The present invention is also directed to a method of removing species from a feed liquid comprising the steps of providing an ion exchange material comprising hydrous zirconium oxide. Passing into contact with the ion exchange material is a feed liquid comprising at least one of the following species: $PO_4$, $HPO_4$, $H_2PO_4$, $AsO_4$, $HAsO_4$, $H_2AsO_4$ and $AsO_3$. The hydrous zirconium oxide removes the at least one species from the feed liquid. The ion exchange material has an affinity towards the at least one species which is characterized by a Kd value of at least 1000 ml/g from 0.001 mol of an aqueous solution comprising phosphorus or arsenic at V:m=100:1 ml/g. The ion exchange material used in this method may have stability against moisture loss characterized by a capacity and selectivity for the at least one chemical species, which do not decrease more than 20% across a moisture content LOD of the material ranging from $0 \leq LOD \leq 40\%$ across a temperature range of up to 200° C. In particular, the feed liquid may be comprised of a biological liquid comprising at least one of the phosphate-containing species. The phosphate-containing species is removed from the biological liquid such as in dialysis. In another aspect of the method, the feed liquid is aqueous and, in particular, drinking water.

Another method of removing species from a feed liquid comprises providing an ion exchange material comprising hydrous zirconium oxide. Passed into contact with the ion exchange material is the feed liquid comprising species selected from the group consisting of oxoanions of Cr, Se, B, Mo, W and combinations thereof. At least one of the species is removed from the feed liquid. The ion exchange material has an affinity towards the at least one of the species which is characterized by a Kd value of at least 200 ml/g from 0.001 mol of an aqueous solution comprising these elements at V:m=100:1 ml/g.

The process steps may be varied to produce a material having particular particle size, surface area and porosity. This is especially advantageous in ion exchange where selected size, surface area and porosity provide advantages including avoiding the problem of restricted flow of the feed liquid exhibited by ion exchange powders. The material may have a granular form without the need for binders which tend to reduce ion exchange capability. The process steps may also affect the affinity of the material for certain species. The inventive material is also advantageously not dependent upon moisture content. While not wanting to be bound by theory, features of the process may inhibit the loss of non-bridging hydroxo groups. This is unexpected and overcomes the problem of traditional HZO materials of a significant decreased ion exchange ability as the water content of the material decreases. The inventive material also is unique in that it overcomes the problem of loss of amorphous character upon heating, which is exhibited by conventional HZO materials. The inventive material is selective for certain ions while being resistant to $SiO_3$, $SO_4$ poisoning. Being inorganic, the inventive material possesses superior chemical and thermal stability and oxidation resistance compared to organic resinous ion exchangers.

Other features, details and advantages of the invention will be apparent from the attached drawings and detailed description that follows.

DETAILED DESCRIPTION

Figure 1:
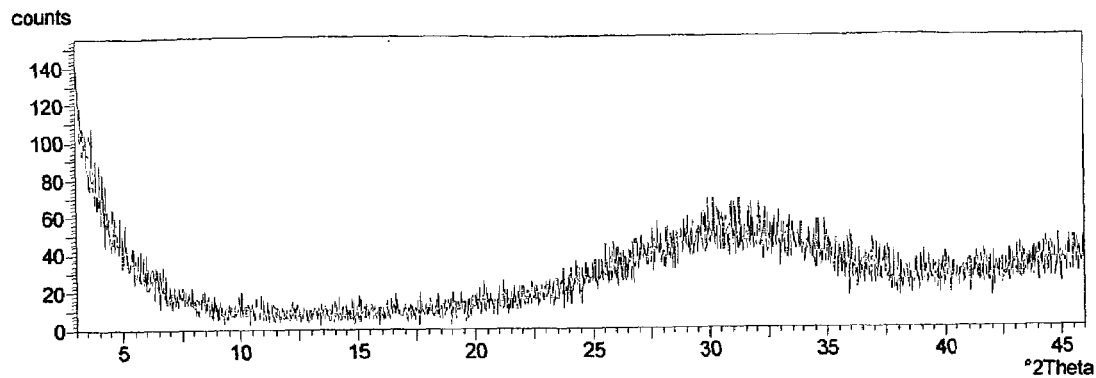
FIG. 1 an X-ray diffraction (XRD) pattern of the inventive amorphous hydrous zirconium oxide prepared according to Example 1.

The present invention provides a method of making hydrous zirconium oxide having desirable properties, including resistance to moisture content, predetermined particle size, and developed porosity and surface area. The inventive material is suitable for use as an ion exchanger, a catalyst and a catalyst support. The process comprises providing a liquid comprising a zirconium compound and an alkali metal-containing reagent. The alkali metal-containing reagent comprises a compound selected from the group consisting of $MOH-M_2SO_4$, $MOH-M_3PO_4$, and combinations thereof, where M is at least one of Li, Na and K. The zirconium compound is treated with the alkali metal-containing reagent effective to form a mixture which achieves an uptake of alkali metal in an amount ranging from 0.5 to 2.5 meq/g, in particular 0.8 to 2.0 meq/g. A molar ratio of $SO_4/Zr$ and $PO_4/Zr$ in the mixture ranges from 0.2-0.7:1.

The mixture is reacted to form the hydrous zirconium oxide.

In particular, the zirconium compound comprises at least one of the following: zirconium tetrachloride, zirconium oxychloride, zirconium acetate, zirconium sulfate, zirconium nitrate, ammonium zirconium carbonate, and potassium zirconium carbonate. The zirconium compound may comprise at least one of the following water insoluble zirconium salts: zirconium oxide, zirconium sulfate, zirconium basic sulfate and zirconium phosphate. More particularly, the water insoluble zirconium compound has a narrow particle size distribution in the range of from 10 to 100 microns. The use of a zirconium compound with an average granule size of 10-100 microns permits producing the inventive amorphous hydrous zirconium oxide ion exchanger with a similar particle size distribution. This particle size distribution is ideally suited (low back pressure, quick kinetics of exchange) for some separation applications, like removal of toxic anions (e.g., As, Se, Cr) from drinking water (e.g., under column conditions) or phosphate anions from biological liquors (e.g., dialysis).

An aqueous suspension of the zirconium compound (e.g., 10 to 30 wt %) is reacted with an aqueous solution of the alkali metal-containing reagent. The treatment of the suspension and the aqueous solution is conducted at a temperature ranging from 80 to 100° C. for 2 to 24 hours or at a temperature ranging from 100 to 150° C. under hydrothermal conditions and autogeneous pressure not exceeding 100 psi for 0.5 to 12 hours.

Conversion of the reaction product into the OH-form by treatment with acid comprising at least one of HCl, HNO$_3$, HBr, HClO, HClO$_4$, CH$_3$COOH and CHOOH having a pH ranging from 4 to 8 at a temperature ranging from 20 to 60, followed by filtration, washing and drying of the material, makes the sorbent ready for direct application and long-term storage.

The inventive hydrous zirconium oxide based ion exchange material exhibits a high affinity towards at least one of the following anions, PO$_4$, HPO$_4$, H$_2$PO$_4$, AsO$_4$, HAsO$_4$, H$_2$AsO$_4$ and AsO$_3$ and a high resistance against poisoning thereof by at least one of SiO$_3$ and SO$_4$ anions. The high affinity is characterized by Kd values of at least 1,000 mL/g from 0.001 Mol phosphorus or arsenic-containing aqueous solution at V:m=100:1, mL/g. See Example 9. Resistance against poisoning is characterized wherein the Kd values for P- and As-containing oxyanions do not change more than up to 10% and, in particular 5-10%, from an initial Kd value in the absence of SiO$_3$ and SO$_4$ anions, compared to a Kd value when adsorption takes place in the presence of an equimolar amount of SiO$_3$ and SO$_4$ anions. The hydrous zirconium oxide of the invention also has an affinity towards species comprising species selected from the group consisting of oxoanions of Cr, Se, B, Mo, W, the affinity being characterized by a Kd value of at least 200 ml/g from 0.001 mol of an aqueous solution comprising these elements at V:m=100:1 ml/g. The inventive material exhibits stability against moisture loss, which means that capacity and selectivity do not change significantly (no more than 20% and, in particular, 5-20%) when the sorbent loses water from LOD=40% to LOD=0% even when the material is heated in a temperature range up to 200° C. In particular, it is also characterized by a pore size distribution ranging from 20 to 40 Å and a surface area of at least 300 M$^2$/g and, in particular, a surface area ranging from 300 to 400 m$^2$/g.

The process is practical from an industrial standpoint. To make HZO resistant to moisture loss, its structure is "stabilized." Freshly prepared amorphous hydrous zirconium oxides (Zr(OH)$_4$ nH$_2$O) contain large quantities of non-bridging hydroxo groups (in an amount >12-15 mMol/g). These groups are highly reactive and participate readily in condensation reactions leading to a loss of ion exchange properties and porous structure collapse according to the reactions:

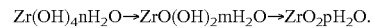

$Zr(OH)_4 nH_2O \rightarrow ZrO(OH)_2 mH_2O \rightarrow ZrO_2 pH_2O$.

In the present invention, while not wanting to be bound by theory, non-bridging hydroxo groups are removed or substituted in the early stages of material polymerization to achieve HZO stabilization. Thermal treatment of HZO in air allows the removal of non-bridging hydroxo groups. However, this process is accompanied by a simultaneous collapse of the porous structure. Under some conditions (e.g., preliminary partial conversion of hydrous zirconium oxide into a cation exchange form in the presence of sulfate and/or phosphate anions, followed by treatment at elevated temperature (normal or high pressure), the hydrous zirconium oxide structure can be stabilized without crystallization of the material. While not wanting to be bound by theory, a partial conversion of HZO into the cation exchange form (0.5-2.5 meq/g alkali metal uptake, more specifically, 0.8-2.0 meq/g alkali metal uptake) directly protects some of the non-bridging hydroxo groups from participating in condensation reactions, while protecting other groups indirectly by creating steric hindrances to reaction. As a result, only a relatively small part of the existing non-bridging hydroxo groups are able to participate in the condensation-polymerization reactions. Moreover, because condensation reactions take place in the presence of "bulky" alkali cations and SO$_4^{2-}$, PO$_4^{3-}$ anions, a mesoporous and sufficiently robust framework sorbent may be formed while avoiding porous structure collapse. These mesoporous materials have a narrow pore size distribution ranging from 20 to 40 A and a surface area ranging from 250 to 400 m$^2$/g.

The inventive method and the role of the reaction components used therein differ from those described in the prior art. The conventional role of SO$_4^2$, PO$_4^{3-}$ anions in producing mesoporous zirconium oxides is as structure building elements (H. R. Chen et al, Mater. Letters, 51, 187 (2001)). These anions remain in the HZO after synthesis and their presence is believed to be necessary for the existence of this type of structure. In the present invention the primary role of the sulfate and phosphate ions is not to serve as structure building elements, but rather is to serve as template agents and agents preventing crystallization of HZO. In the present invention SO$_4^{2-}$ and PO$_4^{3-}$ anions do not significantly incorporate into the structure of the zirconium oxide, which is confirmed by the fact that only trace amounts (less than 0.5 wt. %) of them are found in the final product. The use of these ions in the inventive process may be responsible for improving the inventive adsorbent's resistance to poisoning by SiO$_3$ and SO$_4$ anions. It is known that crystalline compounds are more thermally stable than their amorphous analogues. In the present invention a low extent of substitution of OH groups with alkali metals occurs at a pH of 10-12. These alkaline conditions, in combination with the presence of SO$_4^{2-}$, PO$_4^{3-}$ anions, allow the hydrous zirconium oxide to retain an amorphous structure even after 12 hours of treatment at 150° C. under high pressure, while improving thermal resistance of the material. The ability of HZO to remain amorphous is advantageous in that it maintains the particle size of the final product.

Experimental Equipment

This describes the equipment used in the following examples to characterize the inventive hydrous zirconium oxide material of the present invention. Powder X-ray diffraction measurements were carried out in a Phillips diffractometer, model PW 1729/1720 (scan speed 1 deg/min, step width 0.04 degree, Cu Kα radiation, λ=1.5418 E). Particle size distribution (PSD) was measured using Leeds-Northrup, Microtrack X100. BET surface area measurements and pore size determination were done on Coultier SA3100, nitrogen adsorption. Samples were degassed at 280° C. in a vacuum. Water loss was determined at 209° C. on a Denver Instrument hot plate. Residual sulfur content in HZO was determined by Sulfur & Carbon analyzer LECO SC-444. Phosphorus, arsenic and alkali metals in solution were determined by the ICP method, VARIAN, VISTA-MPX instrument.

The present invention will now be described more specifically by reference to the following examples which are not intended to limit the invention described in the appended claims.

EXAMPLE 1

The inventive amorphous hydrous zirconium oxide was prepared in all the examples. In this example the material was prepared according to the following procedure. In the first stage, a slurry was made containing 250 g of basic zirconium sulfate (i.e., 40% $ZrO_2$) (MEI, HCP PP142A), with a predetermined particle size of 50 to 60 microns, in 1.0 L of 0.1 M $H_2SO_4$. Under constant mixing the required amount of 30 wt. % NaOH solution was added gradually to raise the pH of the reaction mixture to 11.5. The slurry was transferred into an autoclave, sealed and heated at 120° C. for 6 hours under constant stirring. Then, the product of conversion was filtered, washed with 0.5 kg of water and re-slurried in 1 L of water. To the HZO suspension 30 wt. % $HNO_3$ solution was added gradually, effective to adjust the pH to 6.0. Then, the HZO was filtered, washed with 1 kg of water and dried at 100° C. for 12 hours in air (at ambient pressure).

The dried product had a particle size of 45 to 55 microns. According to elemental analysis the sulfur content was <0.05% and the sodium content was <0.1%. The surface area was 360 $m^2/g$. The average pore size was 30 Å. Water loss at 209° C. (LOD) was <1%.

EXAMPLE 2

All of the operations and amounts of reagents used in Example 1 were used in this example, with the only difference being that thermal treatment of basic zirconium sulfate was carried out at 100° C. and ambient pressure for 24 hours. The dried product had a particle size ranging from 45 to 55 microns. According to elemental analysis the sulfur content was <0.05% and the sodium content was <0.1%. The surface area was 330 $m^2/g$. The average pore size was 30 Å. Water loss at 209° C. (LOD) was <1%.

EXAMPLE 3

All of the operations and amounts of reagents used in Example 1 were used in this example, with the only difference being that 30 wt. % KOH solution was used instead of sodium hydroxide. The dried product had a particle size ranging from 45 to 55 microns. According to elemental analysis the sulfur content was <0.05% and the potassium content was <0.1%. The surface area was 300 $m^2/g$. The average pore size was 40 Å. Water loss at 209° C. (LOD) was <1%.

EXAMPLE 4

All of the operations and amounts of reagents used in Example 1 were used in this example, with the only difference being that 10 wt. % LiOH solution was used instead of sodium hydroxide. The dried product had a particle size ranging from 45 to 55 microns. According to elemental analysis the sulfur content was <0.05% and the lithium content was <0.1%. The surface area was 400 $m^2/g$. The average pore size was 30 Å. Water loss at 209° C. (LOD) was <1%.

EXAMPLE 5

All of the operations and amounts of reagents used in Example 1 were used in this example, with the only difference being that hydrous zirconium oxide with a particle size ranging from 40 to 50 microns was used as a source of the zirconium compound. The dried product had a particle size ranging from 35 to 45 microns. According to elemental analysis the sulfur content was <0.05% and the sodium content was <0.1%. The surface area was 360 $m^2/g$. The average pore size was 30 Å. The water loss at 209° C. (LOD) was <1%.

EXAMPLE 6

All of the operations and amounts of reagents used in Example 1 were used in this example with the only difference being that hydrous zirconium oxide with a particle size ranging from 40 to 50 microns was used as a source of the zirconium compound and it was slurried in 1.0 L of 0.2 M $H_3PO_4$. The dried product had a particle size ranging from 35 to 45 microns. According to elemental analysis the phosphorus content was <0.05% and the sodium content was <0.1%. The surface area was 250 $m^2/g$. The average pore size was 40 Å. The water loss at 209° C. (LOD) was <1%.

EXAMPLE 7

Figure 2A:
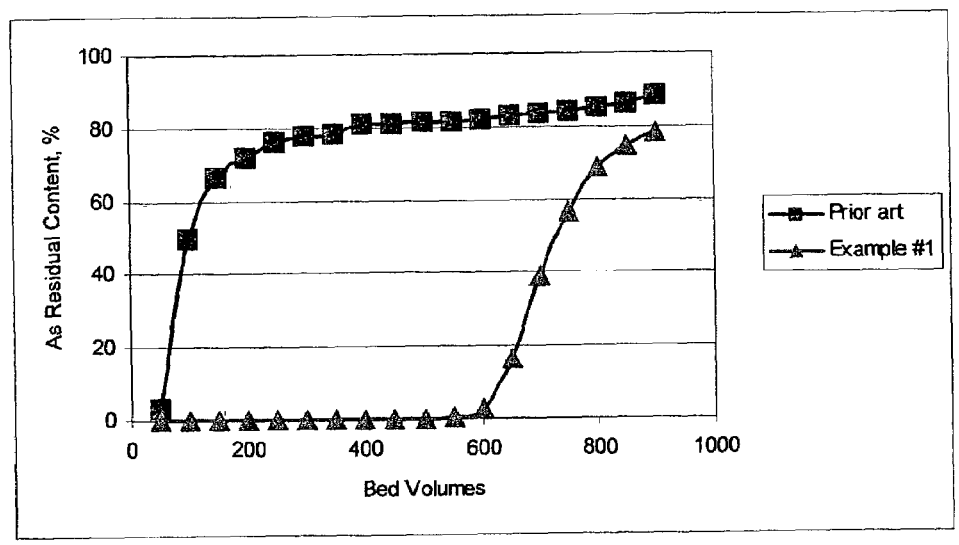
FIG. 2 shows phosphate breakthrough curves for amorphous hydrous zirconium oxide obtained according to Example 1 (FIG. 2a) and prior art hydrous zirconium oxide (FIG. 2b) as a function of residual moisture content in the sorbent.
Figure 2B:
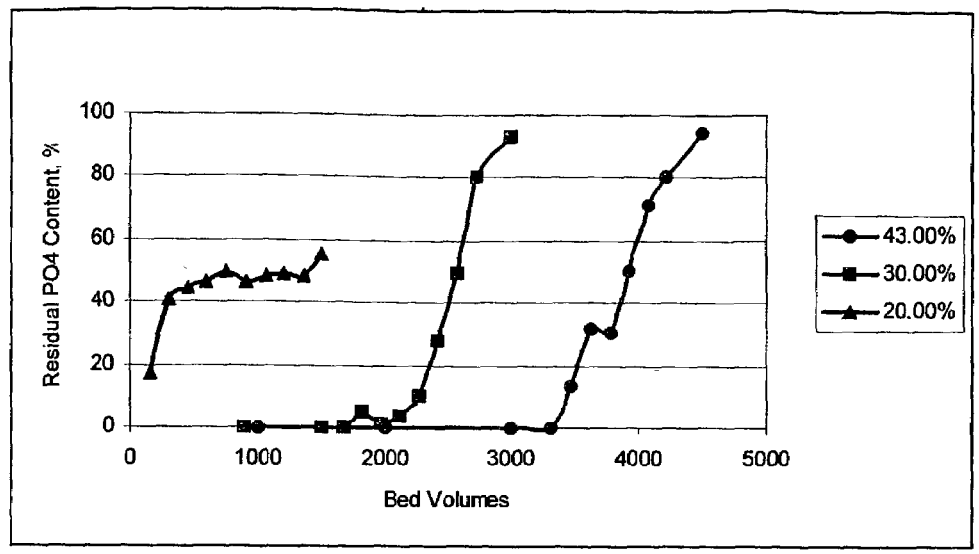

The affinity of the amorphous hydrous zirconium oxide towards phosphate was tested under column conditions. In these experiments 5.00 g of hydrous zirconium oxide made according to Example 1 was put in a vertical column with an inner diameter of 8 mm. A simulant solution (0.02 M $Na_2SO_4$+0.001 M $Na_2HPO_4$) was passed through the adsorbent bed at a flow rate of 120 mL/hour (24 bed volumes/hour) with the use of a peristaltic pump. The concentration of phosphorus in solution (before and after passing the adsorbent layer) was determined using an ICP technique. The breakthrough curves were plotted as residual concentration of ion in solution (in %) versus amounts of bed volumes (BV) of solution passed through the adsorbent (FIG. 2a). For comparison similar data are presented for prior art amorphous hydrous zirconium oxide (MEI, HCP PP142F) (FIG. 2b).

The data show that amorphous hydrous zirconium oxide from Example 1 has a high capacity for phosphate uptake in the presence of excess sulfate ions: ~3 mMol/g (before breakthrough). Moreover, drying of the inventive sorbent to LOD <1% does not affect $PO_4$ uptake, which indicates that HZO is resistant to moisture content. In comparison, the prior art HZO shows high affinity and capacity on $PO_4$ ion only when the hydrous zirconium oxide is highly hydrated (LOD >40%). Even mild drying (residual water content 20-30%) of the prior art HZO results in a drastic loss of capacity. A total loss of capacity was found for prior art HZO dried to LOD <1% (not shown on a graph).

EXAMPLE 8

Figure 3:
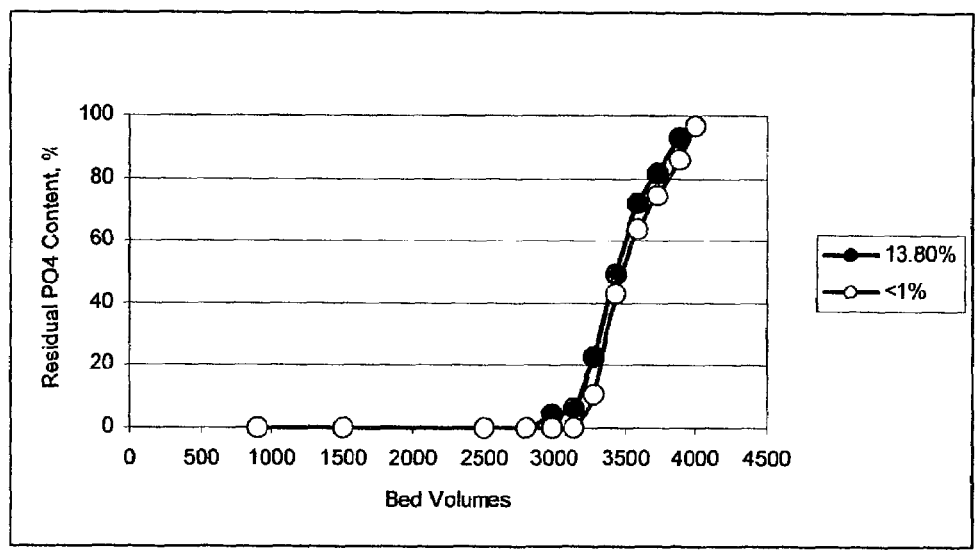
FIG. 3 shows Arsenic(V) breakthrough curves from 0.1 M $Na_2SO_4$+0.001 M $Na_2HAsO_4$ solution for inventive amorphous hydrous zirconium oxide obtained according to Example 1 and dried to 0% residual moisture content and prior art hydrous zirconium oxide dried to residual water content of 30%.

The affinity of the inventive amorphous hydrous zirconium oxide towards arsenic was tested under column conditions. For these experiments 2.00 g of hydrous zirconium oxide prepared according to Example 1 was put in a vertical column with an inner diameter of 7 mm. A simulant solution, 0.1 M $Na_2SO_4$+0.001 M $Na_2HAsO_4$, was passed through the adsorbent bed at a flow rate of 120 muhour (or 60 bed volumes/hour) with the use of a peristaltic pump. Concentration of arsenic in solution (before and after passing the adsorbent layer) was determined using an ICP technique. The breakthrough curves were plotted as residual concentration of ion in solution (in %) versus amounts of bed volumes (BV) of solution passed through the inventive adsorbent (FIG. 3). For comparison, similar data are presented for prior art amorphous hydrous zirconium oxide (MEI, HCP PP142F).

The data show that the amorphous hydrous zirconium oxide of Example 1 (dried to a residual moisture content of 0%) has a high capacity for arsenate ions in the presence of excess sulfate ions: ~0.6 mMol/g (before breakthrough). In comparison, the prior art hydrous zirconium oxide shows extremely low affinity and capacity (<0.02 mMol/g before breakthrough) for arsenic (V) even after mild drying to a residual water content of 30%. A total loss of a capacity was found for the prior art HZO dried to LOD <1 % (not shown on a graph).

EXAMPLE 9

The affinity of HZO from Example 1 and prior art HZO (MEI, HCP PP142F) towards $AsO_4$ uptake in the presence of competitive ions as a function of residual water content is shown in Table 1 where V:m=100:1 (mL/g) and contact time was 24 hours. The affinity of the HZO samples towards elements of interest was expressed through the distribution coefficient ($K_d$, mL/g) values. The $K_d$ values were found according to the formula $K_d=(C_o-C_i/C_i)\cdot V/m$, where $C_o$ is initial concentration in solution, $C_i$ is concentration after equilibration with adsorbent, V is volume in mL, m is mass of exchanger in grams.

TABLE 1

| Sorbent | LOD, wt. % | 0.001 M $AsO_4$ | 0.001 M $AsO_4$ + 0.001 M $SO_4$ | 0.001 M $AsO_4$ + 0.001 M $SiO_3$ |
| --- | --- | --- | --- | --- |
| Ex #1 | 40 | 120,000 | 120,000 | 110,000 |
| Ex #1 | 20 | 125,000 | 125,000 | 120,000 |
| Ex #1 | <1 | 140,000 | 140,000 | 135,000 |
| Prior Art | 40 | 100,000 | 70,000 | 15,000 |
| Prior Art | 20 | 600 | 500 | 400 |
| Prior Art | <1 | 40 | 30 | 10 |

Although the present invention has been described with reference to the examples and with some degree of particularity in the detailed description, it should be understood that various modifications and variations can be made by those skilled in the art without departing from the spirit and scope of the invention as set forth hereafter in the appended claims.

What is claimed is:

1. A method of making hydrous zirconium oxide comprising the steps of providing a liquid comprising a zirconium compound and an alkali metal-containing reagent, said alkali metal-containing reagent comprising a compound selected from the group consisting of MOH-$M_2SO_4$, MOH-$M_3$-$PO_4$, and combinations thereof, where M is at least one selected from the group consisting of Li, Na and K, treating said zirconium compound with said alkali metal-containing reagent effective to form a mixture which achieves an uptake of alkali metal in an amount ranging from 0.5 to 2.5 milliequivalents/gram, heating said mixture to produce a reaction product and treating said reaction product with acid to form said hydrous zirconium oxide.

2. The method of claim 1 wherein said acid comprises an acid selected from the group consisting of HCl, $HNO_3$, HBr, HClO, $HClO_4$, $CH_3COOH$, CHOOH and combinations thereof.

3. The method of claim 1 wherein said uptake of alkali metal ranges from 0.8 to 2.0 milliequivalents/gram.

4. The method of claim 1 wherein a molar ratio of $SO_4$/Zr and $PO_4$/Zr in said mixture ranges from 0.2-0.7:1.

5. The method of claim 1 wherein said zirconium compound comprises a compound selected from the group consisting of zirconium tetrachloride, zirconium oxychloride, zirconium acetate, zirconium sulfate, zirconium nitrate, ammonium zirconium carbonate, potassium zirconium carbonate, zirconium oxide, zirconium basic sulfate, zirconium phosphate and combinations thereof.

6. The method of claim 1 wherein said zirconium compound has a particle size distribution ranging from 10 to 100 microns.

7. The method of claim 1 wherein said zirconium compound comprises a salt selected from the group consisting of zirconium oxide, zirconium sulfate, zirconium basic sulfate, zirconium phosphate and combinations thereof.

8. The method of claim 1 wherein said zirconium compound is water insoluble.

9. The method of claim 1 wherein said heating is conducted at a temperature of 80° C. to 150° C.

10. A method of making hydrous hafnium oxide, comprising the steps of providing a liquid comprising a hafnium compound and an alkali metal-containing reagent, said alkali metal-containing reagent comprising a compound selected from the group consisting of MOH-$M_2SO_4$, MOH-$M_3PO_4$, and combinations thereof, where M is at least one selected from the group consisting of Li, Na and K, treating said hafnium compound with said alkali metal-containing reagent effective to form a mixture which achieves an uptake of alkali metal in an amount ranging from 0.5 to 2.5 milliequivalents/gram, heating said mixture to produce a reaction product and treating said reaction product with acid to form said hydrous hafnium oxide.

11. The method of claim 10 wherein said heating is conducted at a temperature of 80° C. to 150° C.

12. A method of making hydrous zirconium oxide, comprising the steps of:

providing a suspension comprising a zirconium compound and an aqueous solution comprising an alkali metal-containing reagent, said alkali metal-containing reagent comprising a compound selected from the group consisting of MOH-$M_2SO_4$, MOH-$M_3PO_4$, and combinations thereof, where M is at least one selected from the group consisting of Li, Na and K;

treating said suspension with said aqueous solution effective to form a mixture which achieves an uptake of alkali metal in an amount ranging from 0.8 to 2.0 milliequivalents/gram and wherein a molar ratio of $SO_4$/Zr and $PO_4$/Zr in said mixture ranges from 0.2-0.7:1;

heating said mixture at a temperature ranging from 80 to 150° C. to produce a reaction product; and treating said reaction product with acid to form said hydrous zirconium oxide.

13. The method of claim 12 wherein said suspension comprises 10 to 30 wt % of said zirconium compound.

14. The method of claim 12 wherein said heating of said mixture is conducted for 0.5 to 24 hours.

15. The method of claim 12 wherein said heating of said mixture is conducted at a temperature ranging from 100 to 150° C. at a pressure not exceeding 100 psi.

16. The method of claim 12 wherein said heating of said mixture is conducted at a temperature ranging from 100 to 150° C. at a pressure not exceeding 100 psi, and wherein said heating of said mixture is conducted for 0.5-12 hours.

17. The method of claim 12 wherein said acid has a pH ranging from 4 to 8.

18. The method of claim 12 wherein said reaction product is treated with said acid at a temperature ranging from 20 to 60° C.

19. The method of claim 12 wherein said reaction product is treated with said acid at a temperature ranging from 20 to 60° C., and wherein said treatment of said reaction product with acid is conducted for 0.5 to 2 hours.

20. The method of claim 12 comprising filtering and washing said reaction product, redispersing in water said filtered and washed reaction product and filtering, washing and drying said treated reaction product.

21. The method of claim 12 comprising treating said mixture at a pH ranging from 10 to 12.

22. A method of making hydrous zirconium oxide, comprising the steps of:
providing an aqueous mixture comprising a water insoluble zirconium compound and an alkali metal-containing reagent;
heating said aqueous mixture at a temperature ranging from 80 to 150° C. to produce a reaction product; and
treating said reaction product with acid having a pH ranging from 4 to 8 at a temperature ranging from 20 to 60° C. to form said hydrous zirconium oxide.

23. Hydrous zirconium oxide that is granular, amorphous, has no binder that reduces ion exchange capability, has stability against moisture loss and is made by the method of claim 1, wherein said stability against moisture loss is characterized by an affinity for arsenic as measured by a distribution coefficient Kd in a 0.001 M $AsO_4$ solution that does not decrease across a moisture content LOD of said hydrous zirconium oxide ranging from 0<LOD<40%.

24. Hydrous zirconium oxide that is granular, amorphous, has no binder that reduces ion exchange capability and has stability against moisture loss, wherein said stability against moisture loss is characterized by an affinity for arsenic as measured by a distribution coefficient Kd in a 0.001 M $AsO_4$ solution that does not decrease across a moisture content LOD of said hydrous zirconium oxide ranging from 0<LOD<40%.

25. The hydrous zirconium oxide of claim 24 wherein said hydrous zirconium oxide exhibits an affinity towards anions selected from the group consisting of $PO_4$, $HPO_4$, $H_2PO_4$, $AsO_4$, $HAsO_4$, $H_2AsO_4$, $AsO_3$, and combinations thereof.

26. The hydrous zirconium oxide of claim 24 wherein said hydrous zirconium oxide has an affinity towards species selected from the group consisting of oxoanions of Cr, oxoanions of Se, oxoanions of B, oxoanions of Mo, and oxoanions of W.

27. The hydrous zirconium oxide of claim 24 wherein said hydrous zirconium oxide has a pore size distribution ranging from 20 to 40 Å.

28. The hydrous zirconium oxide of claim 24 wherein said hydrous zirconium oxide has a surface area of at least 150 $m^2/g$.

29. The hydrous zirconium oxide of claim 24 wherein said hydrous zirconium oxide has a surface area of at least 250 $m^2/g$.

30. The hydrous zirconium oxide of claim 24 wherein said hydrous zirconium oxide has a surface area of at least 300 $m^2/g$.

31. The hydrous zirconium oxide or claim 24 wherein said hydrous zirconium oxide has a surface area ranging from 300 to 400 $m^2/g$.

32. The hydrous zirconium oxide of claim 24 wherein said hydrous zirconium oxide has a particle size distribution of at least 10 microns.

33. The hydrous zirconium oxide of claim 24 wherein said hydrous zirconium oxide has a particle size distribution of at least 100 microns.

34. The hydrous zirconium oxide of claim 24 wherein said hydrous zirconium oxide has a particle size distribution ranging from 10 to 100 microns.

35. Ion exchange media, catalyst or catalyst support comprising the hydrous zirconium oxide of claim 24.

36. A method of removing species from a feed liquid comprising the steps of:
providing an ion exchange material comprising hydrous zirconium oxide that is granular, amorphous, has no binder that reduces ion exchange capability and has stability against moisture loss characterized by an affinity for arsenic as measured by a distribution coefficient Kd in a 0.001 M $AsO_4$ solution that does not decrease across a moisture content LOD of said hydrous zirconium oxide ranging from 0<LOD<40%;
passing into contact with said ion exchange material said feed liquid comprising species selected from the group consisting of $PO_4$, $HPO_4$, $H_2PO_4$, $AsO_4$, $HAsO_4$, $H_2AsO_4$, $AsO_3$, and combinations thereof; and
removing from said feed liquid at least one of said species.

37. The method of claim 36 wherein said feed liquid is comprised of a biological liquid comprising at least one of said phosphate-containing species, comprising removing said phosphate-containing species from said biological liquid.

38. The method of claim 36 wherein said feed liquid is aqueous.

39. The method of claim 36 wherein said feed liquid is drinking water.

40. A method of removing species from a feed liquid comprising the steps of:
providing an ion exchange material comprising hydrous zirconium oxide that is granular, amorphous, has no binder that reduces ion exchange capability and has stability against moisture loss characterized by an affinity for arsenic as measured by a distribution coefficient Kd in a 0.001 M $AsO_4$, solution that does not decrease across a moisture content LOD of said hydrous zirconium oxide ranging from 0<LOD<40%;
passing into contract with said ion exchange material said feed liquid comprising species selected from the group consisting of oxoanions of Cr, oxoanions of Se, oxoanions of B, oxoanions of Mo, and oxoanions of W; and
removing from said feed liquid at least one of said species.

* * * * *